(12) United States Patent
Castel et al.

(10) Patent No.: US 12,359,114 B2
(45) Date of Patent: *Jul. 15, 2025

(54) COMPOSITION COMPRISING POLYGLYCEROL-10 FATTY ACID ESTER FOR RECOVERING OIL IN TIGHT OIL RESERVOIRS

(71) Applicant: OLEON NV, Evergem (BE)

(72) Inventors: Alys Castel, Margny-lès-Compiègne (FR); Julien Deligny, Venette (FR); Pieter Struelens, Gooik (BE)

(73) Assignee: OLEON NV, Evergem (BE)

( * ) Notice: Subject to any disclaimer, the term of this patent is extended or adjusted under 35 U.S.C. 154(b) by 0 days.

This patent is subject to a terminal disclaimer.

(21) Appl. No.: 18/396,348

(22) Filed: Dec. 26, 2023

(65) Prior Publication Data

US 2025/0207014 A1    Jun. 26, 2025

(51) Int. Cl.
*C09K 8/62* (2006.01)
*E21B 43/27* (2006.01)

(52) U.S. Cl.
CPC .............. *C09K 8/62* (2013.01); *E21B 43/27* (2020.05)

(58) Field of Classification Search
CPC ................................. C09K 8/62; E21B 43/27
See application file for complete search history.

(56) References Cited

U.S. PATENT DOCUMENTS

| | | | |
|---|---|---|---|
| 7,238,647 B2 * | 7/2007 | Hayet | C09K 8/22 166/305.1 |
| 8,210,263 B2 | 7/2012 | Quintero et al. | |
| 9,296,936 B1 | 3/2016 | Jiang et al. | |
| 9,922,013 B2 | 3/2018 | Le Bescond de Coatpont et al. | |
| 2003/0166472 A1 | 9/2003 | Pursley et al. | |
| 2008/0274918 A1 * | 11/2008 | Quintero | C09K 8/524 507/116 |
| 2012/0157366 A1 * | 6/2012 | Anim-Danso | A61K 8/463 510/130 |
| 2014/0090848 A1 * | 4/2014 | Li | C09K 8/035 166/305.1 |
| 2014/0260466 A1 * | 9/2014 | Rehage | C11D 7/5004 252/88.1 |
| 2016/0251568 A1 * | 9/2016 | Do | C09K 8/86 166/270.1 |
| 2018/0072935 A1 | 3/2018 | Frederick et al. | |
| 2018/0155610 A1 | 6/2018 | Goual et al. | |
| 2018/0282610 A1 | 10/2018 | He et al. | |
| 2021/0095184 A1 | 4/2021 | Walker et al. | |
| 2022/0018972 A1 | 6/2022 | Han | |
| 2023/0101188 A1 | 3/2023 | Raney et al. | |
| 2023/0108993 A1 | 4/2023 | Raney et al. | |

FOREIGN PATENT DOCUMENTS

| | | | | |
|---|---|---|---|---|
| ES | 2852056 T3 * | 9/2021 | ............ | A01N 25/02 |
| WO | 2016004215 A1 | 1/2016 | | |

OTHER PUBLICATIONS

ES-2852056—T3 Deprey (English).*
Isaac et al., "Surfactants employed in conventional and unconventional reservoirs for enhanced oil recovery—A review," Energy Reports, 2022, vol. 8, pp. 2806-2830.

* cited by examiner

*Primary Examiner* — Silvana C Runyan
(74) *Attorney, Agent, or Firm* — ArentFox Schiff LLP

(57) ABSTRACT

The present disclosure relates to a composition and a method to use it for releasing the oil trapped in tight oil reservoirs.

8 Claims, No Drawings

COMPOSITION COMPRISING POLYGLYCEROL-10 FATTY ACID ESTER FOR RECOVERING OIL IN TIGHT OIL RESERVOIRS

FIELD

The present disclosure relates to an environment friendly composition and a method for releasing the oil trapped in tight oil reservoirs. The compositions described herein are designed to, among other things, help reduce greenhouse gas emissions.

BACKGROUND

A tight oil reservoir, which may be a tight shale oil reservoir or a tight carbonate reservoir, is an unconventional reservoir that refers to an accumulation of hydrocarbon fluids (oil or gas) that are tightly trapped into a rock porous matrix by important capillary and/or viscous forces.

A fracturing fluid, a type of treatment fluid, is typically a water-based fluid, used to stimulate the release of oil. It is injected into a subterranean formation under high pressure through a wellbore to create fractures in the deep-rock formations through which gas and/or oil will flow more freely into the wellbore so that the hydrocarbons may be pumped out of the well, increasing the recovery of oil.

The recovery of oil from a tight oil reservoir mainly depends on the fracturing fluid. The presence of a surfactant in the fracturing fluid can improve the alteration of the wettability and thus the water imbibition into the rock matrix of the reservoir (Improving oil recovery in the Wolfcamp unconventional liquid reservoir using surfactants in completion fluids, Johannes O. Alvarez, David S. Schechter, 2017).

The wettability refers to the preferential adherence and spread of a fluid to a solid surface in the presence of another immiscible fluid.

Water imbibition in the present application refers to the adsorption of water by the rock. The injected water-based fluid will migrate into the rock matrix due to capillary pressure. When water imbibes, oil is expelled out of the rock into the fracture.

Tight oil reservoirs are oil-wet (hydrophobic) character reservoirs, meaning that the oil preferably adheres and spreads on the formation pore surface of the reservoir. In this condition, water alone cannot easily displace the oil.

A suitable surfactant can reverse the wettability, transforming an oil-wet formation to a water-wet (hydrophilic) formation. Thus, water rather than oil adheres preferentially to the formation pore surface of the reservoir. Water can then displace more easily the oil from the reservoir, the oil no longer adhering on the formation pore surface.

By changing the wettability of the formation pore surface of a reservoir, e.g. changing the oil-wet character of the formation pore surface of the reservoir to water-wet, spontaneous imbibition of water occurs, enabling the oil to flow through the fractures to the wellbore, thus increasing the quantity of hydrocarbons that can be extracted.

Different surfactants suitable for fracturing fluids for unconventional reservoirs are described in literature (Surfactants employed in conventional and unconventional reservoirs for enhanced oil recovery—A review, Oguntade Tomiwa Isaac, Hui Pu, Babalola Aisosa Oni, Fadairo Adesina Samson, 2022):
  anionic surfactants, such as alkyl sulfonates, sulfosuccinates or sulphates;
  non-ionic surfactants, such as linear or branched alkoxylated alcohols or alkoxylated phenols;
  cationic surfactants, such as ammonium salts.

The patent application US2021/0095184, hereby incorporated by reference in its entirety, discloses a fluid for treating unconventional reservoirs, said fluid comprising an anionic surfactant package which preferably comprises a sulfonate, a disulfonate, a polysulfonate, a sulfate, a disulfate, a polysulfate, a sulfosuccinate, a disulfosuccinate, a polysulfosuccinate, a carboxylate, a dicarboxylate, a polycarboxylate, or any combination thereof.

The patent U.S. Pat. No. 10,640,698, hereby incorporated by reference in its entirety, discloses methods for treating subterranean using a treatment fluid comprising an aqueous base fluid and a surfactant comprising an ethoxylated amine or derivative thereof.

The patent U.S. Pat. No. 11,566,169, hereby incorporated by reference in its entirety, describes a well treatment fluid for treating oil-wet formations, comprising a wettability modifier, which includes an alkylamine oxide surfactant, and an organic compound having a phosphonoalkyl moiety.

However, some surfactants may present environmental, health, and safety concerns.

SUMMARY

Due to the continuous rise in crude oil demand, there is a widespread interest in any method that would improve oil recovery. Also, there is still a need for surfactants, advantageously obtained from renewable resources, that would be effective in oil-wet formations and that would increase the quantity of hydrocarbons that can be extracted from tight oil reservoirs by reversing the wettability from oil-wet to water-wet formations.

The inventors found that specific surfactants, obtainable from vegetable oils, used in aqueous compositions, could reverse the wettability of tight rock.

In addition to being sustainable, the compositions described herein enable oil to be released with higher yields.

As a result, for a same quantity of oil recovered, less quantity of composition is necessary, and therefore energy savings are achieved on at least two levels:
  savings in injection energy, since fewer quantity of composition to inject into reservoirs is required;
  production energy savings, since less waste need to be processed.

Energy efficiency has a number of benefits for the environment. In particular, it reduces greenhouse gas emissions.

Thus, the release of oil from tight oil reservoirs, by using the compositions described herein, may enable reduction of greenhouse emissions.

The disclosure relates thus to a composition comprising:
  at least 97 wt % of brine; and
  at least 0.05 wt % of a polyglycerol-10 fatty acid ester.
The brine is a solution of mineral salt(s) in water.
The mineral salt is preferably potassium chloride, calcium chloride, sodium chloride, magnesium chloride, sodium sulfate, sodium bicarbonate, potassium bromide, strontium chloride, sodium fluoride and/or sodium bromide.

Preferably, the quantity of the mineral salt is comprised between 1 and 30 wt % based on the weight of the brine.

Preferably, the quantity of water is comprised between 70 and 99 wt % based on the weight of the brine.

Preferably, the quantity of the brine is of at most 99.95 wt % based on the weight of the composition.

Advantageously, in the composition according to the disclosure, the quantity of brine is comprised between 97 and 99.95 wt % based on the weight of the composition.

In the present application, unless otherwise indicated, all ranges of values used are to be understood as being inclusive limits.

Preferably, the quantity of the brine is of at least 98 wt % based on the weight of the composition.

Preferably, the quantity of the brine is comprised between 97 and 99.90 wt %, more preferably, between 98 and 99.90 wt %, such as between 99 and 99.90 wt %, based on the weight of the composition.

The polyglycerol-10 fatty acid ester (PGE) is obtainable by a process comprising an esterification reaction between a polyglycerol and a fatty acid.

A polyglycerol-10 is obtainable by an oligomerization reaction of glycerol. The oligomerization reaction is preferably carried out at a temperature comprised between 18° and 280° C., optionally in the presence of a catalyst, such as sodium hydroxide, potassium hydroxide or lithium hydroxide. The oligomerization reaction is preferably conducted until the refractive index reaches a value comprised between 1.4898-1.4928 at 60° C. at atmospheric pressure, such as 1.4915 at 60° C. at atmospheric pressure.

The fatty acid of the polyglycerol-10 fatty acid ester, comprises preferably from 6 to 20, more preferably from 6 to 18 carbon atoms, even more preferably from 8 to 16 carbon atoms such as from 8 to 12 carbon atoms.

Preferably, the fatty acid of the polyglycerol-10 fatty acid ester is linear.

The fatty acid of the polyglycerol-10 fatty acid ester may be saturated or unsaturated, preferably saturated.

In particular, the fatty acid is caprylic acid, capric acid and/or lauric acid.

More particularly, the fatty acid lauric acid.

The esterification reaction of the polyglycerol with the fatty acid to obtain the polyglycerol-10 fatty acid ester, is preferably carried out at a temperature between 15° and 250° C. A catalyst may be used to speed up the reaction, such as paratoluene sulfonic acid, methane sulfonic acid, hydrogen chloride or sulfuric acid. The esterification reaction is preferably conducted until the acid value is of at most 1 mgKOH/g.

In the present application, unless otherwise indicated,
acid values are measured according to standard AOCS Cd 3D-63;
hydroxyl values are measured according to method OA-081.
refractive index are measured according to standard ASTM D1218.

Preferably, the quantity of the polyglycerol-10 fatty acid ester is of at most 1 wt % based on the weight of the composition.

Advantageously, in the composition according to the disclosure, the quantity of polyglycerol-10 fatty acid ester is comprised between 0.05 and 1 wt % based on the weight of the composition.

Preferably, the quantity of the polyglycerol-10 fatty acid ester is of at least 0.1 wt % based on the weight of the composition.

Preferably, the quantity of the polyglycerol-10 fatty acid ester is comprised between 0.1 and 1 wt % based on the weight of the composition.

In the composition according to the disclosure, the polyglycerol-10 fatty acid ester has preferably an acid value comprised between 0 and 1 mgKOH/g.

In the composition according to the disclosure, the polyglycerol-10 fatty acid ester presents preferably an hydroxyl value comprised between 50 and 800, more preferably, between 200 and 700 mgKOH/g.

Preferably, the polyglycerol-10 fatty ester of the composition according to the disclosure has an acid value comprised between 0 and 1 mgKOH/g and an hydroxyl value comprised between 50 and 800 mgKOH/g.

The composition according to the disclosure may further comprise an additive such as a proppant, a viscosifying agent, a gelling agent, a friction reducer, a clay control agent, a biocide, a corrosion inhibitor, an iron control agent, a crosslinker, a breaker, a pH control agent, a scale inhibitor and/or an oxygen scavenger.

Those additives are preferably chosen among additives usually used in oilfield.

Preferably, the total quantity of the additives present in the composition according to the disclosure, is comprised between 0.01 and 2 wt % based on the weight of the composition.

Preferably, the composition according to the disclosure do not comprise a surfactant other than the polyglycerol-10 fatty acid esters used in the present disclosure.

A preferred composition according to the disclosure comprises or consists of:
  97-99.9 wt % of brine; and
  0.1-1 wt % of a polyglycerol-10 fatty acid ester
  optionally, 0.01-2 wt % of an additive selected from the group consisting of proppants, viscosifying agents, gelling agents, friction reducers, clay control agents, biocides, corrosion inhibitors, iron control agents, crosslinkers, breakers, pH control agents, scale inhibitors, oxygen scavengers and mixtures thereof.

As shown in Example 4, polyglycerol-10 fatty acid esters are particularly effective to reverse the wettability of shale rocks from oil-wet to water-wet, thus improving the release and then the recovery of oil from those specific reservoirs.

Advantageously, in the composition according to the disclosure, the polyglycerol-10 fatty acid ester is selected from the group consisting of polyglycerol-10 caprylate, polyglycerol-10 caprate, polyglycerol-10 laurate, and mixtures thereof.

Preferably, the polyglycerol-10 fatty acid ester is polyglycerol-10 laurate. As illustrated in Example 4, polyglycerol-10 laurate exhibits the lowest contact angle, meaning that it is the best surfactant to reverse the wettability of shale rocks from oil-wet to water-wet.

Advantageously, in the composition according to the disclosure, the polyglycerol-10 fatty acid ester is polyglycerol-10 laurate.

Thus, the composition according to the disclosure may advantageously be a fracturing fluid, in particular, with the purpose to reverse the wettability of tight rocks from oil-wet to water-wet.

The disclosure also relates to a method for releasing the oil from a tight oil reservoir, comprising injecting the composition according to the disclosure, through a wellbore into the said tight oil reservoir.

Aspects

The disclosure provides the following, specific aspects:
  Aspect 1. A composition comprising:
    at least 97 wt % of brine; and
    at least 0.05 wt % of a polyglycerol-10 fatty acid ester.
  Aspect 2. The composition according to aspect 1, wherein the quantity of brine is comprised between 97 and 99.95 wt % based on the weight of the composition.

Aspect 3. The composition according to aspect 1 or 2, wherein the quantity of polyglycerol-10 fatty acid ester is comprised between 0.05 and 1 wt % based on the weight of the composition.

Aspect 4. The composition according to any of aspects 1 to 3, wherein the polyglycerol-10 fatty acid ester is selected from the group consisting of polyglycerol-10 caprylate, polyglycerol-10 caprate, polyglycerol-10 laurate, and mixtures thereof.

Aspect 5. The composition according to any of aspects 1 to 4, wherein the polyglycerol-10 fatty acid ester is polyglycerol-10 laurate.

Aspect 6. A method for releasing the oil from a tight oil reservoir, comprising injecting the composition according to any of aspects 1 to 5, through a wellbore into the said tight oil reservoir.

EXAMPLES

The disclosure is further described in the following examples. It will be appreciated that the disclosure as claimed is not intended to be limited in any way by these examples.

Example 1: Preparation of Polyglycerol Fatty Acid Esters

1. Oligomerization Reaction of Glycerol to Form Polyglycerols a. Polyglycerol-10 (PG10)

To prepare PG10, 99.9 wt % of glycerol and 0.1 wt % of sodium hydroxide solution at 10% (catalyst) were loaded into a reactor equipped with a distillation unit to remove the water produced during the reaction. The mixture was heated up at 260° C. under stirring at 500 RPM under nitrogen bubbling. The polymerization of glycerol was controlled by refractive index. Once the refractive index at 60° C. reached 1.4915 value, the reaction was stopped. The reactor was then put under reduced pressure to remove the lighter fractions, e.g. water, glycerol and diglycerol. Once the distillation completed, the reactor was set back to atmospheric pressure and cooled down.

b. Polyglycerol-6 (PG6)

PG6 was prepared according to the method described in Example 1.1, except that the reaction was stopped when the refractive index at 60° C. reached 1.4869.

2. Esterification Reaction Between a Polyglycerol and a Fatty Acid to Form a Polyglycerol Fatty Acid Ester A polyglycerol prepared in Example 1.1a) or Example 1.1b) and a fatty acid (1:1 molar ratio) were loaded into a reactor equipped with a distillation unit to remove the water produced during the reaction.

The fatty acid is caprylic acid (C8), capric acid (C10), or lauric acid (C12).

The esterification was carried out at 210° C. under stirring at 400 RPM and nitrogen bubbling. The esterification was stopped when the acid value was below 1 mgKOH/g. The reactor was then cooled down.

3. Characteristics of Polyglycerol Fatty Acid Esters

Characteristics of polyglycerol fatty acid esters obtained in Example 1.2 are described in Table 1.

TABLE 1

Characteristics of polyglycerol fatty acid esters

| | Acid value (AV0) (mgKOH/g) | Hydroxyl value (mgKOH/g) |
|---|---|---|
| PG10-C8 | 0.5 | 530 |
| PG10-C10 | 0.5 | 410 |
| PG10-C12 | 0.7 | 361 |
| PG6-C10 | 0.8 | 550 |
| PG6-C12 | 0.9 | 493 |

Example 2: Evaluation of the Properties of Polyglycerol-10 Fatty Acid Esters

1. Dispersibility Property

To evaluate the dispersibility of the polyglycerol-10 fatty acid esters, 0.1 wt % of each polyglycerol-10 fatty acid ester prepared in Example 1.3 was diluted in 99.9 wt % of a brine comprising 5 wt % of potassium chloride (KCl) in 95 wt % of deionized water.

A part of the mixture obtained rested at room temperature for 24 hours, and another part put in an oven at 80° C. for 24 hours.

The aspect of the mixture were then assessed. An homogeneous system is targeted to consider the surfactant well dispersed in the brine.

After one day at 25° C. or 80° C., all the dispersions remained homogeneous.

PG10 fatty acid esters are therefore suitable for applications requiring their dispersion in brine.

2. Stability Property

To evaluate the stability of the polyglycerol-10 fatty acid esters, 20 wt % of each polyglycerol-10 fatty acid ester (PGE) prepared in Example 1.3 were diluted in 80 wt % of a brine comprising 5 wt % of potassium chloride (KCl) in 95 wt % of deionized water.

The resulting mixture was put in an oven at 80° C. for 14 days.

80° C. is the usual temperature of tight shale rock reservoirs.

Then, the acid value (AV14) of each mixture was measured to determine the degradation.

The degradation refers to the ester's hydrolysis.

The degradation is calculated as followed:

Degradation or hydrolysis rate (wt %)=((AV14−AV0)/initial PGE concentration)/initial PGE saponification value;

wherein,

AV0 is the acid value measured in Example 3.1;

the initial saponification value was measured according to the standard ASTM D5558-95.

If less than 20 wt % of a polyglycerol-10 fatty acid ester are hydrolyzed after 14 days at 80° C., the polyglycerol-10 fatty acid ester is considered as stable.

Results are gathered in Table 2.

TABLE 2

Degradation of polyglycerol-10 fatty acid esters in brine

| | PG10-C8 | PG10-C10 | PG10-C12 |
|---|---|---|---|
| Degradation after 14 days at 80° C. | 11.43 wt % | 6.64 wt % | 4.88 wt % |

PG10 fatty acid esters are therefore suitable to be used in saline conditions and at 80° C., as in a tight shale oil reservoir.

3. Surface Tension Property

To evaluate the surface tension of the polyglycerol-10 fatty acid esters, 0.1 wt % of a polyglycerol fatty acid ester Comparative fracturing fluid CF3 was prepared by mixing 0.1 wt % of Triton X100, polyethyleneglycol-[4-(1,1,3,3-tetramethylbutyl)phenyl]-ether (CAS Number: 9036-19-5), with 99.9 wt % of a brine comprising 5 wt % potassium chloride (KCl) in deionized water.

Chemicals and quantities for each fracturing fluid are specified in Table 4.

TABLE 4

| | Content of fracturing fluids | | | | | | |
|---|---|---|---|---|---|---|---|
| | F 1 (wt %) | F2 (wt %) | F 3 (wt %) | F 4 (wt %) | CF1 (wt %) | CF2 (wt %) | CF3 (wt %) |
| PG10-C8 | 0.1 | | | | | | |
| PG10-C10 | | 0.1 | | | | | |
| PG10-C12 | | | 0.1 | 0.5 | | | |
| PG6-C10 | | | | | 0.1 | | |
| PG6-C12 | | | | | | 0.1 | |
| Triton X100 | | | | | | | 0.1 |
| KCl brine (5 wt %) | 99.9 | 99.9 | 99.9 | 99.5 | 99.9 | 99.9 | 99.9 | prepared in Example 1.3 was diluted in 99.9 wt % of a brine comprising 5 wt % of potassium chloride (KCl) in 95 wt % of deionized water.

The surface tension of the product is then assessed at 80° C. with the force tensiometer K100 from Kruss, using the Wilhelmy plate method according to the standard DIN EN 14370.

A value lower than 30 mN/m is targeted for unconventional reservoirs (Research of a novel fracturing-production integral fluid based on cationic surfactant, Yan et al, 2023).

Results are gathered in Table 3.

TABLE 3

| Surface tension of polyglycerol-10 fatty acid esters in brine | | |
|---|---|---|
| | PG10-C10 | PG10-C12 |
| Surface tension at 80° C. | 25.47 mN/m | 25.43 mN/m |

Polyglycerol-10 fatty acid esters present a low surface tension, even lower than the surface tension of Triton X100, which is of 29.68 mN/m.

Triton X100, polyethyleneglycol-[4-(1,1,3,3-tetramethylbutyl)phenyl]-ether (CAS Number: 9036-19-5), is usually used in fracturing fluids.

This low surface tension indicates that PG10 fatty acid esters can be useful for releasing oil trapped in rock pores.

Example 3: Preparation of Compositions According to the Disclosure as a Fracturing Fluid Fracturing fluids F1-F3 were prepared by mixing 0.1 wt % of a polyglycerol-10 fatty acid ester prepared in Example 1.3 in 99.9 wt % of a brine comprising 5 wt % potassium chloride (KCl) in deionized water.

Fracturing fluid F4 were prepared by mixing 0.5 wt % of PG10-C12 prepared in Example 1.3 in 99.5 wt % of a brine comprising 5 wt % potassium chloride (KCl) in deionized water.

Comparative fracturing fluid CF1 was prepared by mixing 0.1 wt % of PG6-C10 with 99.9 wt % of a brine comprising 5 wt % potassium chloride (KCl) in deionized water.

Comparative fracturing fluid CF2 was prepared by mixing 0.1 wt % of PG6-C12 with 99.9 wt % of a brine comprising 5 wt % potassium chloride (KCl) in deionized water.

Example 4: Evaluation of the Wettability Alteration Property of Fracturing Fluids The wettability alteration property is usually evaluated through contact angle measurements on rock surfaces.

In the present case, the reverse of the wettability from oil-wet shale rock to water-wet shale rock was evaluated by measuring the contact angles formed by a drop of oil on the surface of rocks immerged in different fracturing fluids.

In presence of an oil-wet surface, the drop of oil spreads over the surface of the rock, maximizing the contact with the solid surface, since the affinity between the drop of oil and the rock is high.

In presence of water-wet surface, the drop of oil beads up over the surface of the rock, minimizing the contact with the solid surface, since the affinity between the drop of oil and the rock is low.

Generally, a solid surface is considered water-wet if the contact angle is lower than 75°.

To mimic the reservoir conditions, and have a "oil-wet" rock, clean shale rocks were first aged in an oil (a light sweet naphthenic crude oil) for 10 days at 80° C. under 10 bars.

A clean rock is a rock soaked into a mixture of xylene/acetone followed by solvent evaporation at room temperature. This operation is repeated until the xylene/acetone solution is uncoloured.

The oil-wet shale rocks, also named aged shale rocks, thus obtained were each immerged in a fracturing fluid in a sealed container for 3 days at 80° C.

Then, shale rocks were placed each in turn on support in a glass cell, filled with the fracturing fluid at room temperature.

The oil (light sweet naphthenic crude oil) was injected in the media with a syringe equipped with a J shape needle to drop it under the shale rock.

The efficiency of the fracturing fluid to reverse the wettability was evaluated by measuring the contact angle between the shale rock surface and the drop of oil.

The contact angle measurement was made with the DSA 100 Drop Shape Analyzer from Krüss, using the captive drop method.

A blank was also performed with an aged shale rock immerged in only KCl brine (5 wt %) for 3 days at 80° C.

Each evaluation has been repeated four times per tested fluid. The average of the four measurements and the standard deviation are gathered in Table 5.

TABLE 5

Contact angles formed between an oil drop and the surface of a shale rock

| | | Average contact angle value | Standard deviation |
|---|---|---|---|
| Blank | KCl brine (5 wt % KCl in water) | 130.30° | 15.88° |
| F1 | PG10-C8 (0.1 wt % in KCl brine (5 wt %)) | 45.93° | 3.90° |
| F2 | PG10-C10 (0.1 wt % in KCl brine (5 wt %)) | 44.45° | 0.31° |
| F3 | PG10-C12 (0.1 wt % in KCl brine (5 wt %)) | 37.00° | 5.91° |
| F4 | PG10-C12 (0.5 wt % in KCl brine (5 wt %)) | 37.43° | 4.82° |
| CF1 | PG6-C10 (0.1 wt % in KCl brine (5 wt %)) | 120.75° | 19.36° |
| CF2 | PG6-C12 (0.1 wt % in KCl brine (5 wt %)) | 135.00° | 11.93° |
| CF3 | Triton X100 (0.1 wt % in KCl brine (5 wt %)) | 55.70° | 1.71° |

It can be observed that without any surfactant in the brine (Blank) the contact angle is high (130.3°), meaning that the drop of oil spreads well over the surface of the shale rock, meaning that the shale rock is still oil-wet. The immersion of a shale rock in a KCl brine doesn't change its wettability.

The contact angles measured when the shale rock is immersed in a fracturing fluid comprising a polyglycerol-10 fatty acid ester (F1-F4) are all lower than 50°. This demonstrates a particularly good ability of polyglycerol-10 fatty acid esters to reverse the wettability of shale rocks from oil-wet to water-wet.

In particular, F3 and F4 comprising PG10-C12 exhibits the lowest contact angles, and so the better ability to reverse the wettability of tight shale oil reservoirs.

As expected, CF3, comprising Triton X100, presents a good contact angle, lower than 75°, so it can indeed be used to reverse wettability of rocks.

On the contrary, the contact angle measured when the shale rock was immersed in a fracturing fluid comprising a polyglycerol-6 fatty acid ester (CF1 and CF2) stayed high, meaning PG6-C10 and PG6-C12 have no effect on the wettability of the shale rock.

The invention claimed is:

1. A composition comprising:
   between 97-99.95 wt % of brine; and
   between 0.05 and 1 wt % of a polyglycerol-10 fatty acid ester,
   wherein said polyglycerol-10 fatty acid ester is effective to reverse the wettability of oil-wet reservoir from oil-wet to water-wet.

2. The composition according to claim 1, wherein the polyglycerol-10 fatty acid ester is selected from the group consisting of polyglycerol-10 caprylate, polyglycerol-10 caprate, polyglycerol-10 laurate, and mixtures thereof.

3. The composition according to claim 1, wherein the polyglycerol-10 fatty acid ester is polyglycerol-10 laurate.

4. A method for releasing an oil from an oil-wet reservoir, comprising injecting a composition comprising: between 97-99.95 wt % of brine; and between 0.05 and 1 wt % of a polyglycerol-10 fatty acid ester through a wellbore into the oil-wet reservoir, wherein said polyglycerol-10 fatty acid ester is effective to reverse the wettability of rocks from oil-wet to water-wet.

5. The method according to claim 4, wherein the polyglycerol-10 fatty acid ester is selected from the group consisting of polyglycerol-10 caprylate, polyglycerol-10 caprate, polyglycerol-10 laurate, and mixtures thereof.

6. The method according to claim 4, wherein the polyglycerol-10 fatty acid ester is polyglycerol-10 laurate.

7. The method according to claim 4, wherein the composition further comprises an additive.

8. The method according to claim 7, wherein the additive is a proppant, a viscosifying agent, a gelling agent, a friction reducer, a clay control agent, a biocide, a corrosion inhibitor, an iron control agent, a crosslinker, a breaker, a pH control agent, a scale inhibitor and/or an oxygen scavenger.

* * * * *